F. WILLIAMS.
CHURN OPERATING MECHANISM.
APPLICATION FILED APR. 2, 1914.
1,187,216.
Patented June 13, 1916.
2 SHEETS—SHEET 1.
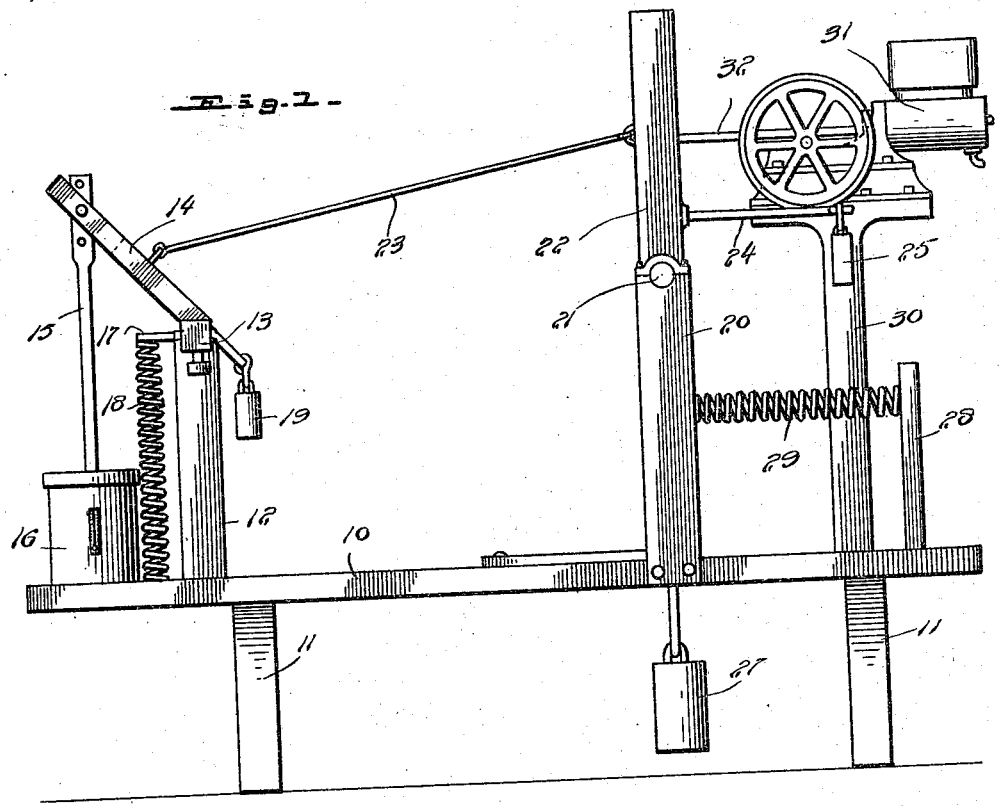
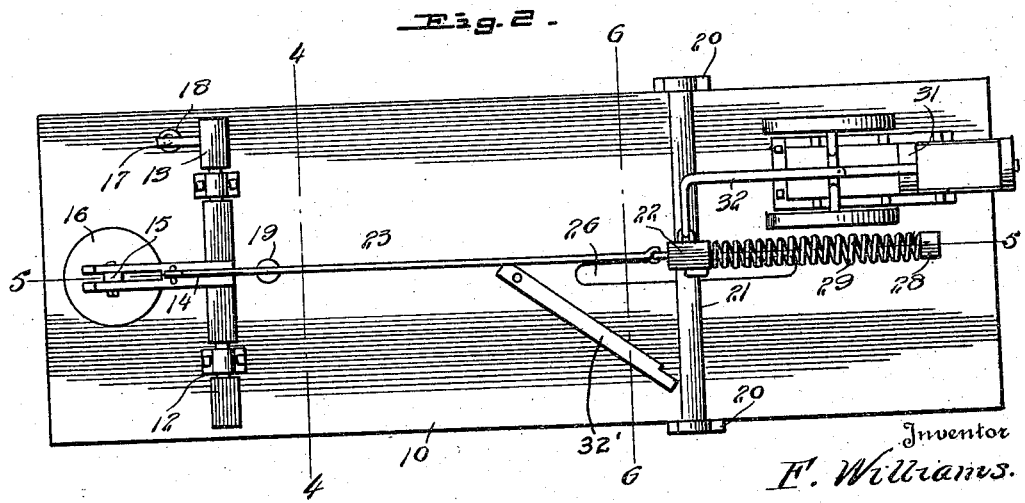

F. WILLIAMS.
CHURN OPERATING MECHANISM.
APPLICATION FILED APR. 2, 1914.
1,187,216.
Patented June 13, 1916.
2 SHEETS—SHEET 2.
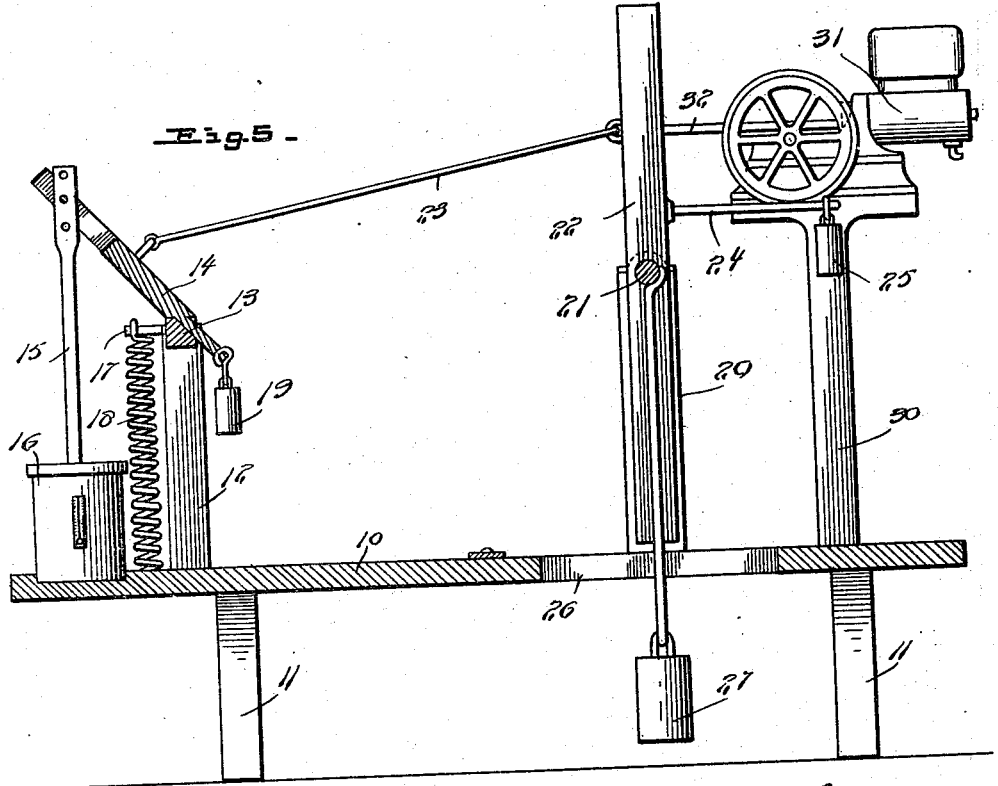
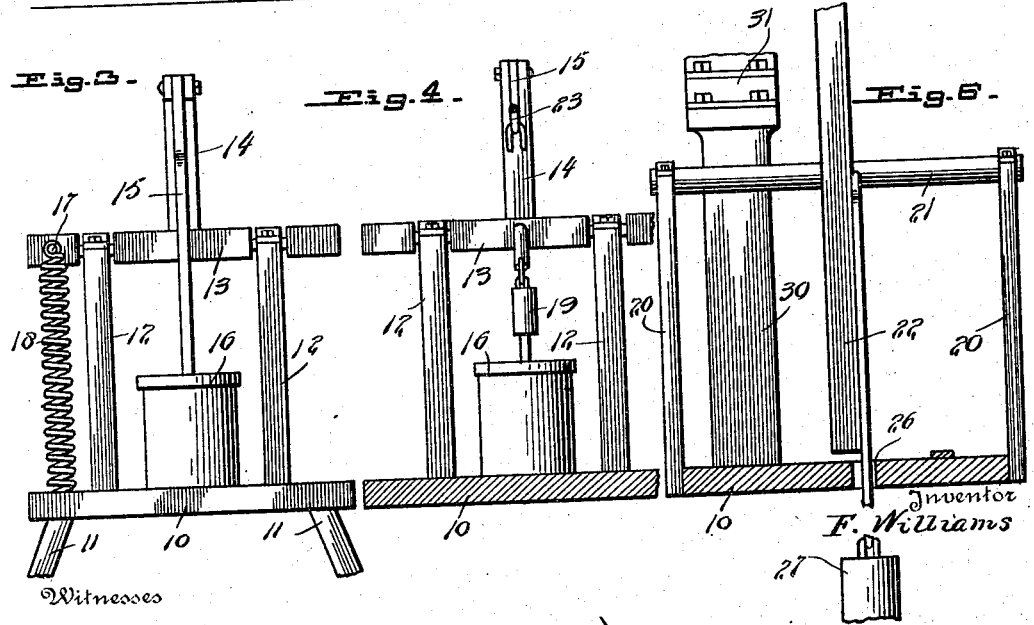

UNITED STATES PATENT OFFICE.

FELIX WILLIAMS, OF MARVELL, ARKANSAS, ASSIGNOR OF ONE-HALF TO EMMETT REESE, OF MARVELL, ARKANSAS.

CHURN-OPERATING MECHANISM.

1,187,216.  Specification of Letters Patent.  Patented June 13, 1916.

Application filed April 2, 1914. Serial No. 829,086.

*To all whom it may concern:*

Be it known that I, FELIX WILLIAMS, a citizen of the United States, residing at Marvell, in the county of Phillips, State of Arkansas, have invented certain new and useful Improvements in Churn-Operating Mechanism; and I do hereby declare the following to be a full, clear, and exact description of the invention, such as will enable others skilled in the art to which it appertains to make and use the same.

This invention relates to improvements in churns and particularly to mechanisms for driving them.

The principal object is to provide a novel device for reciprocating the dasher of a churn.

Another object is to provide a mechanism which is so balanced that the churn can be driven at a steady speed.

Other objects and advantages will be apparent from the following description, when taken in connection with the accompanying drawings.

In the drawings: Figure 1 is a side elevation of a mechanism. Fig. 2 is a top plan view. Fig. 3 is an end view. Fig. 4 is a vertical transverse sectional view on the line 4—4 of Fig. 2. Fig. 5 is a vertical longitudinal sectional view on the line 5—5 of Fig. 2. Fig. 6 is a transverse section on the line 6—6 of Fig. 2.

Referring particularly to the accompanying drawings, 10 represents a platform which is supported by the legs 11. Mounted at one end of the platform are the vertical parallel uprights 12, in the upper ends of which is mounted a rock shaft 13. Secured to this shaft and extending radially therefrom is an arm 14, the outer end of which is bifurcated and has pivotally mounted in said bifurcation the upper end of the churn dasher rod 15. The churn body 16 is mounted on the platform adjacent the uprights 12 and receives the lower end of the rod 15. At one end of the shaft 13 is a radially extending arm 17, and connected at its opposite ends respectively to the arm and to the platform is a spring 18. The arm 14 extends a short distance from the opposite side of the shaft and carries a counterbalancing weight 19. Mounted adjacent the other end of the platform are the uprights 20 which support a transverse rock shaft 21, said shaft having secured thereto a vertical lever 22 which extends above and below the shaft, as shown. Connecting the lever 22 above its pivot with the arm 14 is a link 23, and extending from the opposite side of the lever 22 above its pivot is an arm 24 provided with a weight 25 on its outer end. The lever 22 extends downwardly through a longitudinal slot 26 formed in the platform, and carries on its lower end a weight 27. Connected to the lever 22 and to a suitable upright 28 mounted on the platform at the rear of the lever is a spring 29. Mounted adjacent the upright 28 and on a suitable support 30 is an engine cylinder 31, this engine having its piston rod 32 connected to the lever 22 above the pivot thereof.

The reciprocation of the engine piston rod will rock the lever 22 back and forth, which will raise and lower the arm 14 through the connection of the link 23, and cause the reciprocation of the dasher rod 15. Pivotally mounted on the platform at one end of the slot 26 is a horizontally moving latch arm 32' which is arranged to be swung over the slot so as to engage with and stop the movement of the swinging lever 22.

What is claimed is:

A motor comprising a support, a lever connected adjacent one end to the support adapted for connection at its other end with a churn dasher rod, a lug on the lever adjacent its pivot, means engaging the lug and support for holding the lever yieldably at one limit of its movement, a vertical lever having a horizontal pivot and provided with a counterbalance for holding it normally in vertical position, a link connection between the two levers for actuating the former from the latter when the latter is swung on its pivot, means for resiliently opposing movement of the vertical lever in one direction from its vertical position, and means for swinging the vertical lever upon its pivot.

In testimony whereof, I affix my signature, in the presence of two witnesses.

FELIX WILLIAMS.

Witnesses:
L. B. CHAMBERS,
D. MAST.

Copies of this patent may be obtained for five cents each, by addressing the "Commissioner of Patents, Washington, D. C."